(12) United States Patent
Weber et al.

(10) Patent No.: US 12,493,810 B2
(45) Date of Patent: Dec. 9, 2025

(54) PULSE GENERATION IN A QUANTUM DEVICE OPERATOR

(71) Applicant: Quantum Machines, Tel Aviv (IL)

(72) Inventors: Ori Weber, Tel Aviv (IL); Nir Halay, Tel Aviv (IL); Assaf Bismut, Tel Aviv (IL); Oded Wertheim, Tel Aviv (IL); Yonatan Cohen, Tel Aviv (IL); Nissim Ofek, Tel Aviv (IL); Itamar Sivan, Tel Aviv (IL)

(73) Assignee: Q.M Technologies Ltd. (IL)

( * ) Notice: Subject to any disclaimer, the term of this patent is extended or adjusted under 35 U.S.C. 154(b) by 819 days.

(21) Appl. No.: 17/739,599

(22) Filed: May 9, 2022

(65) Prior Publication Data

US 2023/0359916 A1    Nov. 9, 2023

(51) Int. Cl.
*G06N 10/80* (2022.01)
*G06N 10/40* (2022.01)

(52) U.S. Cl.
CPC ................................. *G06N 10/40* (2022.01)

(58) Field of Classification Search
CPC .............................. G06N 10/40; G06N 10/80
See application file for complete search history.

(56) References Cited

U.S. PATENT DOCUMENTS

| | | |
|---|---|---|
| 4,875,484 A | 10/1989 | Anzai et al. |
| 6,223,228 B1 | 4/2001 | Ryan et al. |
| 6,426,984 B1 | 7/2002 | Perino et al. |
| 6,993,108 B1 | 1/2006 | Chi et al. |
| 7,451,292 B2 | 11/2008 | Routt |
| 7,535,931 B1 | 5/2009 | Zampetti et al. |
| 7,627,126 B1 | 12/2009 | Pikalo |
| 8,315,969 B2 | 11/2012 | Roetteler |
| 8,385,878 B2 | 2/2013 | Rao |
| 8,750,717 B1 | 6/2014 | Yap et al. |
| 9,207,672 B2 | 12/2015 | Williams |
| 9,400,499 B2 | 7/2016 | Williams |
| 9,509,324 B2 | 11/2016 | McDonald et al. |
| 9,663,358 B1 | 5/2017 | Cory et al. |
| 9,692,423 B2 | 6/2017 | McDermott, III |
| 9,847,121 B2 | 12/2017 | Frank |
| 9,858,531 B1 | 1/2018 | Monroe |

(Continued)

FOREIGN PATENT DOCUMENTS

| | | |
|---|---|---|
| CA | 2420022 | 2/2003 |
| CN | 104467843 | 3/2015 |

(Continued)

OTHER PUBLICATIONS

Extended European Search Report Appln No. 19889443.8 dated Aug. 4, 2022.

(Continued)

*Primary Examiner* — Nghia M Doan
(74) *Attorney, Agent, or Firm* — McAndrews, Held & Malloy, Ltd.

(57) ABSTRACT

In a quantum computer, quantum algorithms are performed by exciting a qubit with a quantum control pulse. This quantum control pulse is an electromagnetic RF signal that is generated at baseband according to an analog waveform. An application digitally generates samples of this analog waveform using multiple classical processors that control multiple physical channels in parallel.

112 Claims, 6 Drawing Sheets

(56) References Cited

U.S. PATENT DOCUMENTS

| | | | |
|---|---|---|---|
| 9,892,365 | B2 | 2/2018 | Rigetti |
| 9,978,020 | B1 | 5/2018 | Gambetta |
| 9,979,400 | B1 | 5/2018 | Sete |
| 9,996,801 | B2 | 6/2018 | Shim |
| 10,063,228 | B2 | 8/2018 | Deurloo et al. |
| 10,122,351 | B1 | 11/2018 | Naaman |
| 10,127,499 | B1 | 11/2018 | Rigetti |
| 10,192,168 | B2 | 1/2019 | Rigetti |
| 10,223,643 | B1 | 3/2019 | Bishop et al. |
| 10,333,503 | B1 | 6/2019 | Cohen et al. |
| 10,454,459 | B1 | 10/2019 | Cohen |
| 10,496,069 | B2 | 12/2019 | Nazarathy et al. |
| 10,505,524 | B1 | 12/2019 | Cohen |
| 10,560,076 | B1 | 2/2020 | Cohen |
| 10,637,449 | B1 | 4/2020 | Cohen et al. |
| 10,659,018 | B1 | 5/2020 | Cohen |
| 10,666,238 | B1 | 5/2020 | Cohen |
| 10,958,253 | B1 | 3/2021 | Cohen et al. |
| 10,985,739 | B2 | 4/2021 | Cohen et al. |
| 11,010,145 | B1 | 5/2021 | Smith et al. |
| 11,463,075 | B2 | 10/2022 | Cohen et al. |
| 11,616,497 | B2 | 3/2023 | Cohen et al. |
| 11,616,498 | B2 | 3/2023 | Cohen et al. |
| 2004/0266084 | A1 | 12/2004 | Fujishima et al. |
| 2005/0180575 | A1 | 8/2005 | Maeda et al. |
| 2006/0093376 | A1 | 5/2006 | Mitchell et al. |
| 2008/0037693 | A1 | 2/2008 | Andrus et al. |
| 2011/0035511 | A1 | 2/2011 | Biederman |
| 2013/0198499 | A1 | 8/2013 | Dice et al. |
| 2016/0125311 | A1 | 5/2016 | Fuechsle et al. |
| 2016/0267032 | A1 | 9/2016 | Rigetti et al. |
| 2016/0292586 | A1 | 10/2016 | Rigetti et al. |
| 2017/0094618 | A1 | 3/2017 | Bjorkengren |
| 2017/0214410 | A1 | 7/2017 | Hincks et al. |
| 2017/0364796 | A1 | 12/2017 | Wiebe |
| 2018/0013426 | A1 | 1/2018 | Deurloo et al. |
| 2018/0032893 | A1 | 2/2018 | Epstein |
| 2018/0091244 | A1 | 3/2018 | Abdo |
| 2018/0107579 | A1 | 4/2018 | Chapman |
| 2018/0123597 | A1 | 5/2018 | Sete |
| 2018/0237039 | A1 | 8/2018 | Mong et al. |
| 2018/0260245 | A1 | 9/2018 | Smith |
| 2018/0260730 | A1 | 9/2018 | Reagor |
| 2018/0260732 | A1 | 9/2018 | Bloom |
| 2018/0308007 | A1 | 10/2018 | Amin |
| 2018/0322409 | A1 | 11/2018 | Barends |
| 2018/0365585 | A1 | 12/2018 | Smith |
| 2018/0373995 | A1 | 12/2018 | Tomaru et al. |
| 2018/0375650 | A1 | 12/2018 | Legre |
| 2019/0042964 | A1 | 2/2019 | Elsherbini et al. |
| 2019/0042965 | A1 | 2/2019 | Clarke |
| 2019/0042970 | A1* | 2/2019 | Zou .................. G06F 9/3877 |
| 2019/0042971 | A1 | 2/2019 | Zou |
| 2019/0042972 | A1 | 2/2019 | Zou |
| 2019/0042973 | A1 | 2/2019 | Zou |
| 2019/0049495 | A1 | 2/2019 | Ofek |
| 2019/0251478 | A1 | 8/2019 | Bishop et al. |
| 2019/0266512 | A1 | 8/2019 | Shen et al. |
| 2019/0302832 | A1 | 10/2019 | Morgan et al. |
| 2019/0385088 | A1 | 12/2019 | Naaman et al. |
| 2020/0293080 | A1 | 9/2020 | Poon et al. |
| 2020/0364602 | A1 | 11/2020 | Niu et al. |
| 2021/0004707 | A1 | 1/2021 | Gambetta et al. |
| 2021/0103847 | A1 | 4/2021 | Akzam |
| 2021/0125096 | A1 | 4/2021 | Puri et al. |
| 2021/0173660 | A1* | 6/2021 | Hogaboam .......... G06F 9/3851 |
| 2023/0139805 | A1* | 5/2023 | Morf .................. G06F 15/16 |

FOREIGN PATENT DOCUMENTS

| | | |
|---|---|---|
| CN | 105281886 A | 1/2016 |
| CN | 105912070 A | 8/2016 |
| CN | 108111306 A | 6/2018 |
| CN | 110085094 A | 8/2019 |
| CN | 110677210 | 1/2020 |
| CN | 111464154 A | 7/2020 |
| CN | 111767055 A | 10/2020 |
| CN | 112019193 A | 12/2020 |
| CN | 112149832 A | 12/2020 |
| EP | 0388052 | 9/1990 |
| JP | 2011175078 A | 9/2011 |
| JP | 2012188875 | 10/2012 |
| WO | 2015178991 A2 | 11/2015 |
| WO | 2015178992 A2 | 11/2015 |
| WO | 2017078735 A1 | 5/2017 |
| WO | 2017123940 | 7/2017 |
| WO | 2017139683 A1 | 8/2017 |
| WO | 2018055607 | 3/2018 |
| WO | 2018062991 A1 | 4/2018 |
| WO | 2019063117 A1 | 4/2019 |
| WO | 2020033807 A1 | 2/2020 |
| WO | 2020231795 A1 | 11/2020 |
| WO | 2021/123903 | 6/2021 |

OTHER PUBLICATIONS

Int'l Search Report and Written Opinion Appln No. PCT/IB2022/054903 mailed Sep. 8, 2022.

Int'l Preliminary Report on Patentability Appln No. PCT/IB2021/000067 mailed Sep. 22, 2022.

Int'l Search Report and Written Opinion Appln No. PCT/IB2022/053304 mailed Oct. 6, 2022.

Serrano, Javier, M. Lipinski, T. Wlostowski, E. Gousiou, Erik van der Bij, M. Cattin, and G. Daniluk. "The white rabbit project." (2013) Sep. 19, 2013 (Sep. 19, 2013) Entire document.

Extended European Search Report Appln No. 19910800.2 dated Oct. 6, 2022.

Hornibrook J M et al: "Cryogenic Control Architecture for Large-Scale Quantum Computing", arxiv.org, Cornell University Library, 201 Olin Library Cornell University Ithaca, NY 14853, Sep. 8, 2014 (Sep. 8, 2014), XP081391509.

Fu X et al: "An Experimental Microarchitecture for a Superconducting Quantum Processor", Micro-50 '17: Proceedings of the 50th Annual IEEE/ACM International Symposium on Microarchitecture, Cornell University Library, 201 Olin Library Cornell University Ithaca, NY 14853, Oct. 14, 2017 (Oct. 14, 2017), pp. 1-13, XP081291220.

Zopes J. et al: "High resolution quantum sensing with shaped control pulses", arxiv.org, Cornell University Library, 201 Olin Library Cornell University Ithaca, NY 14853, May 22, 2017 (May 22, 2017), XP081276850.

Cross et al. "Open Quantum Assembly Language", Jan. 10, 2017.

European Office Communication with extended Search Report Appln No. 20766036.6 dated Nov. 24, 2022.

Japanese Patent Office Action Appln No. 2021-529723 dated Oct. 26, 2022 with translation.

Int'l Search Report and Written Opinion Appln No. PCT/IB2022/000059 mailed Jul. 7, 2022.

Moreira , "QuTech Central Controller: A Quantum Control Architecture for a Surface-17 Logical Qubit." Delft University of Technology Student Theses Collection (2019). Available at the following URL: http://resolver.tudelft.nl/uuid:502ed5e5-8717-42bd-a077-c24b7281cd94 May 10, 2019 (May 10, 2019).

Int'l Preliminary Report on Patentability Appln No. PCT/IB2020/001004 mailed Jun. 30, 2022.

Int'l Search Report and Written Opinion Appln No. PCT/IB2022/000024 mailed Jul. 18, 2022.

Baier, Simon, Matteo Pompili, Sophie LN Hermans, Hans KC Beukers, Peter C. Humphreys, Raymond N. Schouten, Raymond FL Vermeulen et al. "Realization of a Multi-Node Quantum Network of Remote Solid-State Qubits", Science, vol. 372, pp. 259-264 (2021) Baier Simon Apr. 16, 2021 (Apr. 16, 2021).

Int'l Search Report and Written Opinion Appln No. PCT/IB2022/000068 mailed Jul. 17, 2022.

D. Copsey et al., "Toward a scalable, silicon-based quantum computing architecture," in IEEE Journal of Selected Topics in Quantum Electronics, vol. 9, No. 6, pp. 1552-1569, Nov.-Dec. 2003, doi: 10.1109/JSTQE.2003.820922. Dec. 31, 2003 (Dec. 31, 2003).

U.S. Appl. No. 62/294,966, filed Feb. 12, 2016.

(56) References Cited

OTHER PUBLICATIONS

Int'l Search Report and Written Opinion Appln No. PCT/IB2019/001410 mailed Jun. 10, 2020.
Int'l Search Report and Written Opinion Appln No. PCT/IB2019/001394 mailed Jun. 17, 2020.
Zhang J, Hegde SS, Suter D. Pulse sequences for controlled 2-and 3-qubit gates in a hybrid quantum register. arXiv preprint arXiv:1806.08408. Jun. 21, 2018.
Wang CY, Kuznetsova L, Gkortsas VM, Diehl L, Kaertner FX, Belkin MA, Belyanin A, Li X, Ham D, Schneider H, Grant P. Mode-locked pulses from mid-infrared quantum cascade lasers. Optics Express. Jul. 20, 2009;17(15):12929-43.
Int'l Search Report and Written Opinion Appln No. PCT/IB2020/000218 mailed Aug. 11, 2020.
Quan R, Zhai Y, Wang M, Hou F, Wang S, Xiang X, Liu T, Zhang S, Dong R. Demonstration of quantum synchronization based on second-order quantum coherence of entangled photons. Scientific reports. Jul. 25, 2016;6:30453. Jul. 25, 2016 (Jul. 25, 2016).
Int'l Search Report and Written Opinion Appln No. PCT/IB2020/000376 mailed Sep. 17, 2020.
Breitfelder et al. eds., IEEE 100: The Authoritative Dictionary of IEEE Standards Terms 1247, definition 2 of "variable" (7th ed. 2000). (Year: 2000).
Int'l Search Report and Written Opinion Appln No. PCT/IB2020/000707 mailed Jan. 12, 2021.
National Academies of Sciences, Engineering, and Medicine. "Quantum Computing: Progress and Prospects". eprint (Dec. 2018) [online]. [retrieved on Jan. 7, 2020]. retrieved from: <https://doi.org/10.17226/25196.> Dec. 4, 2018 (Dec. 4, 2018) pp. 114, 142, 210, Fig. 2.5, Qiskit Backend Specifications at footnote 57: section 4.2, 5.1.5, Fig. 3, Fig. 4 , pp. 30, 57.
IBM Research. "Qiskit Backend Specifications for OpenQASM and OpenPulse Experiments". eprint arXiv:1809.03452v1 (Sep. 10, 2018) [online]. [retrieved on Jan. 7, 2020]. retrieved from: <https://arxiv.org/pdf/1809.03452.pdf> Sep. 10, 2018 (Sep. 10, 2018) section 4.2, 5.1.5, Fig. 3, Fig. 4 , pp. 30, 57.
Int'l Search Report and Written Opinion Appln No. PCT/IB2020/000704 mailed Jan. 17, 2021.
Wolfowicz, et al. Pulse Techniques for Quantum Information Processing University of Chicago, University College London, eMagRes, 2016, vol. 5: 1515-1528. DOI 10.1002/9780470034590.emrstm1521.
Int'l Search Report and Written Opinion Appln No. PCT/IB2020/000555 mailed Dec. 27, 2020.
Int'l Search Report and Written Opinion Appln No. PCT/IB2020/000760 mailed Jan. 27, 2021.
"Quantum-classical interface based on single flux quantum digital logic". In: Quantum Science and Technology 3.2 (2018), pp. 1-16. DOI: 10.1088/2058-9565/aaa3a0.(retrieved on Jan. 20, 2021). Retrieved from the Internet: <https://arxiv.org/pdf/1710.04645.pdf> McDermott R. et al. Oct. 12, 2017 (Oct. 12, 2017) Section VI, VII, VIII.
Roffe, J., Quantum Error Correction: An Introductory Guide, Dept. of Physics & Astronomy, Univ. of Sheffeld, UK, Oct. 10, 2019, pp. 1-29.
Int'l Search Report and Written Opinion Appln No. PCT/IB2020/001004 mailed May 13, 2021.
Int'l Preliminary Report on Patentability Appln No. PCT/IB2019/001410 mailed Jun. 10, 2021.
Int'l Search Report and Written Opinion Appln No. PCT/IB2021/000067 mailed Jun. 21, 2021.
Int'l Preliminary Report on Patentability Appln No. PCT/IB2019/001394 mailed Jul. 29, 2021.
Int'l Preliminary Report on Patentability Appln No. PCT/IB2020/000218 mailed Sep. 16, 2021.
Int'l Preliminary Report on Patentability Appln No. PCT/IB2020/000376 mailed Nov. 12, 2021.
Int'l Search Report and Written Opinion Appln No. PCT/IB2021/056254 mailed Dec. 1, 2021.
Ribeiro, Diogo C., Pedro M. Cruz, and Nuno Borges Carvalho, "Towards a denser frequency grid in phase measurements using mixer-based receivers." 2015 85th Microwave Measurement Conference (ARFTG). IEEE, 2015. Dec. 31, 2015 (Dec. 31, 2015).
Int'l Preliminary Report on Patentability Appln No. PCT/IB2020/000555 mailed Feb. 10, 2022.
Int'l Preliminary Report on Patentability Appln No. PCT/IB2020/000707 mailed Mar. 17, 2022.
Int'l Preliminary Report on Patentability Appln No. PCT/IB2020/000704 mailed Mar. 17, 2022.
Int'l Preliminary Report on Patentability Appln No. PCT/IB2020/000760 mailed Apr. 7, 2022.
Int'l Search Report and Written Opinion Appln No. PCT/IB2022/050190 mailed Apr. 11, 2022.

\* cited by examiner

PULSE GENERATION IN A QUANTUM DEVICE OPERATOR

BACKGROUND

Limitations and disadvantages of conventional methods and systems for generation of pulses in a quantum device will become apparent to one of skill in the art, through comparison of such approaches with some aspects of the present method and system set forth in the remainder of this disclosure with reference to the drawings.

BRIEF SUMMARY

Methods and systems are provided for pulse processing in a quantum device operator, substantially as illustrated by and/or described in connection with at least one of the figures, as set forth more completely in the claims.

DETAILED DESCRIPTION

Figure 1:
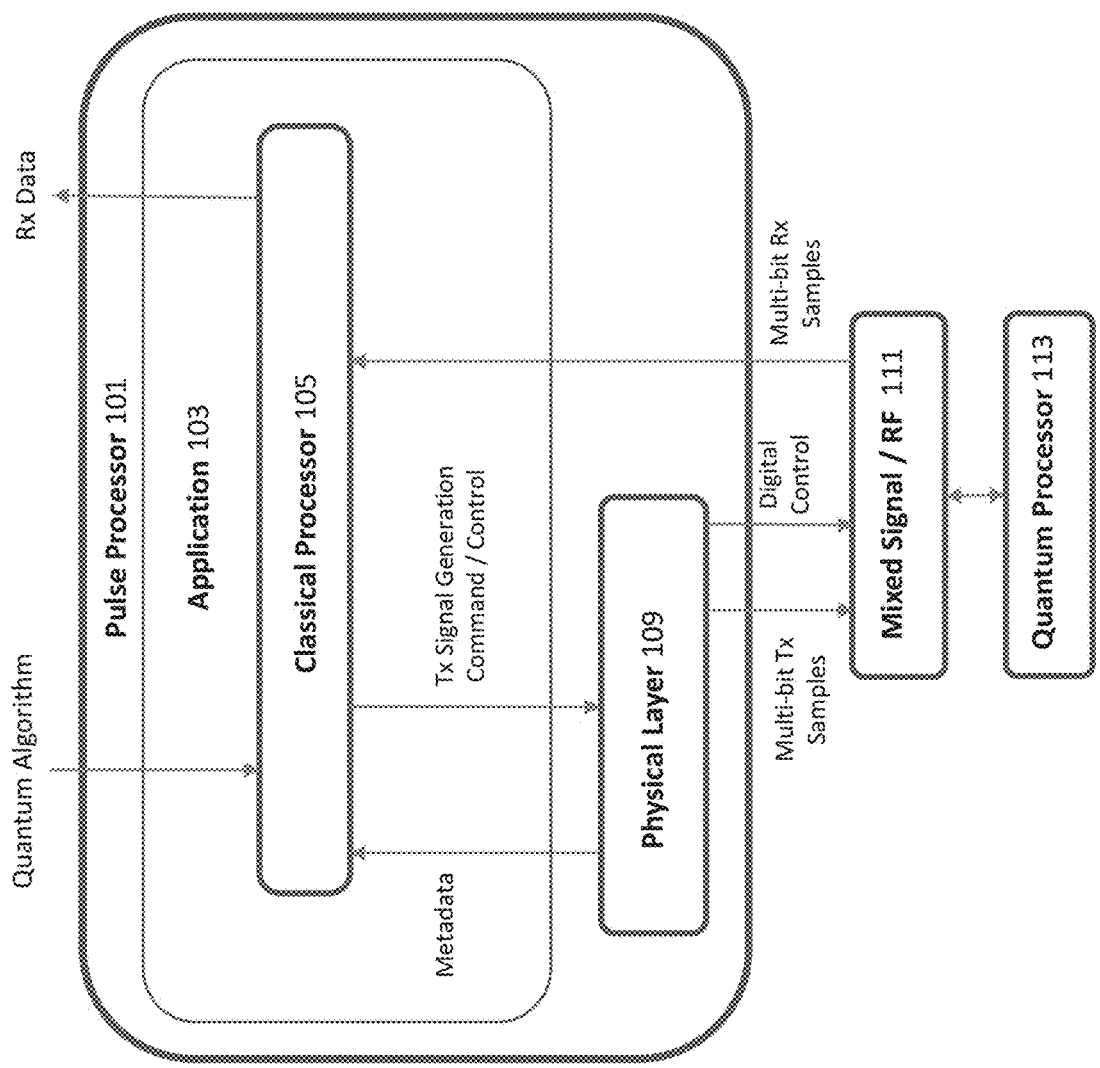
FIG. 1 illustrates a first example system for pulse processing in a quantum device operator in accordance with various example implementations of this disclosure.

Classical computers operate by storing information in the form of binary digits ("bits") and processing those bits via binary logic gates. At any given time, each bit takes on only one of two discrete values: 0 (or "off") and 1 (or "on"). The logical operations performed by the binary logic gates are defined by Boolean algebra and circuit behavior is governed by classical physics. In a modern classical system, the circuits for storing the bits and realizing the logical operations are usually made from electrical wires that can carry two different voltages, representing the 0 and 1 of the bit, and transistor-based logic gates that perform the Boolean logic operations.

Logical operations in classical computers are performed on fixed states. For example, at time 0 a bit is in a first state, at time 1 a logic operation is applied to the bit, and at time 2 the bit is in a second state as determined by the state at time 0 and the logic operation. The state of a bit is typically stored as a voltage (e.g., 1 $V_{dc}$ for a "1" or 0 $V_{dc}$ for a "0"). The logic operation typically comprises of one or more transistors.

Obviously, a classical computer with a single bit and single logic gate is of limited use, which is why modern classical computers with even modest computation power contain billions of bits and transistors. That is to say, classical computers that can solve increasingly complex problems inevitably require increasingly large numbers of bits and transistors and/or increasingly long amounts of time for carrying out the algorithms. There are, however, some problems which would require an infeasibly large number of transistors and/or infeasibly long amount of time to arrive at a solution. Such problems are referred to as intractable.

Quantum computers operate by storing information in the form of quantum bits ("qubits") and processing those qubits via quantum gates. Unlike a bit which can only be in one state (either 0 or 1) at any given time, a qubit can be in a superposition of the two states at the same time. More precisely, a quantum bit is a system whose state lives in a two dimensional Hilbert space and is therefore described as a linear combination $\alpha|0\rangle+\beta|1\rangle$, where $|0\rangle$ and $|1\rangle$ are two basis states, and $\alpha$ and $\beta$ are complex numbers, usually called probability amplitudes, which satisfy $|\alpha|^2+|\beta|^2=1$. Using this notation, when the qubit is measured, it will be 0 with probability $|\alpha|^2$ and will be 1 with probability $|\beta|^2$. The basis states $|0\rangle$ and $|1\rangle$ can also be represented by two-dimensional basis vectors $$\begin{bmatrix}1\\0\end{bmatrix} \text{ and } \begin{bmatrix}0\\1\end{bmatrix},$$

respectively. The qubit state may represented by $$\begin{bmatrix}\alpha\\\beta\end{bmatrix}.$$

The operations performed by the quantum gates are defined by linear algebra over Hilbert space and circuit behavior is governed by quantum physics. This extra richness in the mathematical behavior of qubits and the operations on them, enables quantum computers to solve some problems much faster than classical computers. In fact, some problems that are intractable for classical computers may become trivial for quantum computers.

Unlike a classical bit, a qubit cannot be stored as a single voltage value on a wire. Instead, a qubit is physically realized using a two-level quantum mechanical system. For example, at time 0 a qubit is described as $$\begin{bmatrix}\alpha_1\\\beta_1\end{bmatrix},$$

at time 1 a logic operation is applied to the qubit, and at time 2 the qubit is described as $$\begin{bmatrix}\alpha_2\\\beta_2\end{bmatrix}.$$

Many physical implementations of qubits have been proposed and developed over the years. Some examples of qubits implementations include superconducting circuits, spin qubits, and trapped ions.

A quantum orchestration platform (QOP) may comprise a quantum controller (QC), a quantum programming subsystem and a quantum processor.

A QC generates the precise series of external signals, usually pulses of electromagnetic waves and pulses of baseband voltage, to perform the desired logic operations (and thus carry out the desired quantum algorithm).

The quantum programming subsystem comprises circuitry operable to generate a quantum algorithm description which configures the QC and includes instructions the QC can execute to carry out the quantum algorithm (i.e., generate the necessary outbound quantum control pulse(s)) with little or no human intervention during runtime. In an example implementation, the quantum programming system is a personal computer comprising a processor, memory, and other associated circuitry (e.g., an x86 or x64 chipset). The quantum programming subsystem then compiles the high-level quantum algorithm description to a machine code version of the quantum algorithm description (i.e., series of binary vectors that represent instructions that the QC's hardware can interpret and execute directly). The quantum programming subsystem may be coupled to the QC via an interconnect which may, for example, utilize a universal serial bus (USB), a peripheral component interconnect (PCIe) bus, wired or wireless Ethernet, or any other suitable communication protocol.

The QC comprises circuitry operable to load the machine code quantum algorithm description from the programming subsystem via the interconnect. Then, execution of the machine code by the QC causes the QC to generate the necessary outbound quantum control pulse(s) that correspond to the desired operations to be performed on the quantum processor (e.g., sent to qubit(s) for manipulating a state of the qubit(s) or to readout resonator(s) for reading the state of the qubit(s), etc.). Depending on the quantum algorithm to be performed, outbound pulse(s) for carrying out the algorithm may be predetermined at design time and/or may need to be determined during runtime. The runtime determination of the pulses may comprise performance of classical calculations and processing in the QC during runtime of the algorithm (e.g., runtime analysis of inbound pulses received from the quantum processor).

During runtime and/or upon completion of a quantum algorithm performed by the QC, the QC may output data/results to the quantum programming subsystem. In an example implementation these results may be used to generate a new quantum algorithm description for a subsequent run of the quantum algorithm and/or update the quantum algorithm description during runtime.

A QC comprises a plurality of pulse processors, which may be implemented in a field programmable gate array, an application specific integrated circuit or the like. A pulse processor is operable to control outbound pulses that drive a quantum element (e.g., one or more qubits and/or resonators). A pulse processor is also operable to receive inbound pulses from a quantum element.

FIG. 1 illustrates a first example system for pulse processing in a quantum device operator (QDO) in accordance with various example implementations of this disclosure.

Quantum algorithms are performed by one or more quantum elements interacting with quantum control pulses. The quantum processor 113 consists of several quantum elements, e.g., qubits, Resonators and flux line. A readout resonator is coupled to the qubits. The resonating frequency of a resonator depends on the qubit state. Sending an outbound pulse from the QC to the resonator would result in an inbound response back to the QC that depends on the qubit state which can be extracted by classical computation.

A flux line is an element that can couple 2 qubits to perform a 2 qubit gate, or to a single qubit to manipulate its state and resonating frequency.

These quantum control pulses are electromagnetic RF signals. The RF signals may be generated by upconverting a baseband analog waveform. Alternatively RF signals may be directly modulated. An application circuit 103 in a pulse processor 101 digitally generates samples of this analog waveform. These waveform samples are further modified in a frontend module 109 according to post-processing instructions from the application circuit 103.

The pulse processor 101 is configured to execute the control flow of a quantum algorithm program using a classical processor 105. The classical processor 105 is able to perform computations in the processor and impact the flow of the program and/or the transmitted pulses.

The classical processor 105 is configured to control a physical layer module 109 to generate analog waveforms and digital signaling. The analog waveforms are sent, via the physical layer module 109, to various DAC channels in a mixed signal/RF circuit 111. The physical layer module 109 may be configured to shape and modulate the analog waveforms according to control signals from the classical processor 105. These control signals may also depend on the previous measurements. The digital waveforms may be used as digital markers that follow the analog pulses as the analog pulses are fed through the physical layer module 109 and the mixed signal/RF circuit 111.

The digital marker may be used to: activate laboratory auxiliary measurement equipment, operate auxiliary equipment that is essential to execute the program, dynamically control a digital gate, and capture the inbound readout response of the qubits to send the user raw data for post processing and analysis. The dynamic control of the digital gate may enable the analog waveform transmission to the quantum element, while the QC plays analog data to the quantum element to reduce noise when not playing to the element.

The mixed signal/RF circuit 111 is operable to convert the analog waveforms from a digital representation to an analog signal that is modulated to RF and used to excite a quantum element such as a qubit in a quantum processor 113. To generate results from the quantum algorithm program, the pulse processor 101 is also operable to receive, via one or more downconverters and ADCs in the mixed signal/RF circuit 111, readout responses from a resonator in the quantum processor 113. The classical processor 105 is operable to perform state estimation on the readout responses to affect the program dynamic branching as well as result generation. Any classical parameter (e.g., frequency, phase, chrip rate, etc. . . . ) may also be modified according to previous measurements.

Figure 2:
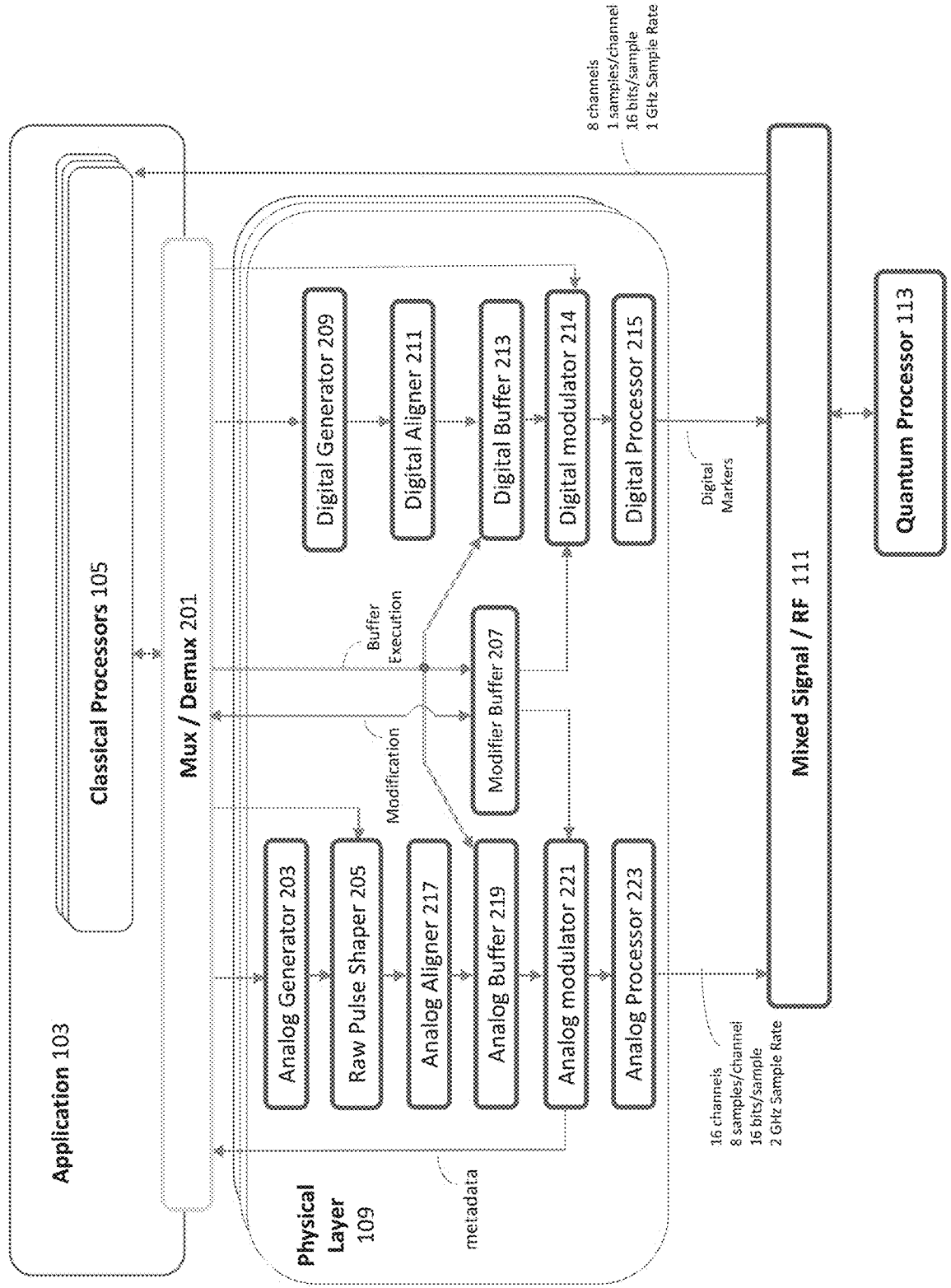
FIG. 2 illustrates a second example system for pulse processing in a quantum device operator in accordance with various example implementations of this disclosure.

FIG. 2 illustrates a second example system for pulse processing in a quantum device operator in accordance with various example implementations of this disclosure.

The physical layer 109 comprises an analog signal generator 203 and a digital signal generator 209 that are configured to generate analog baseband signals and digital baseband signals according to the plurality of commands. The analog baseband signals are operably coupled, via an outbound channel through the physical layer 109 to a quantum element in the quantum processor 113, via the mixed signal/RF circuit 111.

The application circuit 103 in FIG. 2 is able to perform dynamic computations by a set of (e.g., 4) classical processors 105. Using a set of (e.g., 16) physical layer circuits 109, the physical layer circuits 109 are operable to generate a plurality of (e.g., 16) parallel analog pulses at a high sampling rate (e.g., 2 GHz) and plurality of (e.g., 16) parallel digital pulses at a high sampling rate (e.g., 1 GHz). The classical processors 105 are also able to simultaneously perform state estimation using complex demodulation on any of the (e.g., 8) inbound pulses from the mixed signal/RF circuit 111 received at a high sampling rate (e.g., 2 GHz).

Each physical layer circuit 109 comprises an analog generator 203, an analog pulse shaper 205, an analog aligner 217, and an analog buffer 219, an analog modulator 221, and an analog processor 223.

The classical processors 105 may send instructions at a rate that is slower than the rate of pulse generation. The pulse generation instruction data may also be smaller than the waveform generated. Therefore, M classical processors 105 are suitable to drive N physical layer circuits 109, where N>M.

For analog waveform processing, each of the physical layer circuits 109 are able to generate analog raw waveform via an analog generator 203, shape the raw waveform via a raw pulse shaper 205, and transfer the shaped analog waveform to a DAC on the mixed signal/RF circuit 111.

The raw pulse shaper 205 couples two adjacent analog generators and mixes them together, if both are supposed to drive the IQ components of a qubit, with a logic oscillator (in 111 or externally to the controller) or via direct synthesis. The coupling occurs with a general manipulation matrix, controlling the effect of each waveform on the other, and manipulating the gain value of each analog waveform.

The analog aligner 217 gathers samples in 0.5 ns resolution and sends them only when a sufficient amount of samples (e.g., 8) per clock cycle (e.g., 250 MHz) are received as required to drive the DAC (e.g., at 2 GHz). The analog aligner 217 is also able to fill in samples (e.g., via padding or extrapolating available samples in the aligner) according to an opcode to dispatch the data.

The analog modulator 221 is able to apply a correction matrix to negate physical imperfection in the mixed signal/RF circuit 111, rotate a frame, and modulate.

The analog processor 223 is able to apply a cross correlation matrix to negate the effect analog pulses have on adjacent channels, FIR/IIR filter, accumulate, prevent saturation, route, delay and add a DC bias correction value, The analog processor 223 may be operable to perform frame rotation, apply a correction matrix, FIR filter (e.g., 80 coefficients in 0.5 resolution allowing 40 ns history), IIR filter (e.g., 3 sets of a single IIR coefficient filter cascaded), apply a cross correlation matrix, accumulate, check saturation, and route to a port.

The digital aligner 209 is able to align associated digital samples according to the samples in the analog aligner 217.

The digital modulator 214 is able to apply convolution and delay. The digital modulator 214 is also able to dynamically gate digital pulses based on a processor real-time computation.

The digital processor 215 is operable to perform accumulation, routing and polarity setting.

The analog waveform may be used to generate a constant pulse, an arbitrary pulse (e.g., at 2 GHz), a 3rd order interpolated pulse (e.g., at 2 GHz), or a ramp pulse driven directly from the classical processor (e.g., at 250 MHz). The ramp pulse may be piecewise linear with an additional base value and slopes controlled from the classical processor 105. An IF modulation frequency may be dynamically controlled in the analog modulator 221.

There may be more physical layer circuits 109 than RF channels. For example, a single RF channel may drive multiple quantum elements via different frequencies. Also, every physical layer circuits 109 may set the channel index dynamically every cycle. The analog generator 203 in each channel receives an instruction from one of the classical processors 105 via a demux channel 201. Each analog generator channel may generate (e.g., 8) analog samples per cycles and each sample may comprise (e.g., 16) bits. The raw pulse shaper 205 receives an instruction from one of the classical processors 105 and applies a general manipulation matrix on the analog samples. The analog samples may be sent in pairs (i.e., 2 channels at a time) to the raw pulse shaper 205.

Analog generator commands may comprise instruction fields that specify delay, pulse length, an analog generator index (identifying a particular analog generator 203), a DAC index (identifying a particular DAC is the mixed signal circuit/RF 111), a modulation index (associated with the analog modulator 221), an analog type (e.g., constant, arbitrary, non-linear, interpolated), a base address (for the constant, arbitrary and interpolated type), a base value (for the non-linear type), an interpolation step (for the interpolated type), a non-linear intermediate incline rate, IQ Mode (i.e., two analog adjacent generators are IQ modulated), and a general manipulation matrix enable (i.e., whether or not to use the matrix in the shaper 205). Interpolated analog pulses may be dynamically controlled according to an interpolation rate.

Shaping commands may comprise instruction fields that specify matrix values (e.g., G00, G01, G10, G11 for a 2×2 matrix), a shaper index (identifying a particular raw pulse shaper 205), and concatenation. If concatenation is set, a new pulse would continue from where the previous pulse finished, to create smooth and contentious pulses. For example, if pulse A was finished at −0.2V and pulse B is a ramp pulse from 0 to 0.5V, pulse B would begin from −0.2V and finish at 0.3V to allow continuity.

Digital commands may comprise instruction fields that specify a base address, and index (identifying a particular digital generator 209), a delay, a length, and a digital manager route index (associated with the digital processor 215). Each instruction/command is also accompanied with a valid signal to enable and specify a new instruction.

The classical processors 105 are able to generate buffer modification and buffer execution signals which are sent to the physical layer 109 to modify the analog pulses, as well as govern their timely execution out of the physical layer 109. The buffer modification and buffer execution signals are also used internally for feedback by a modifier buffer 207 and for a digital buffer inside the physical layer circuit 109.

Each digital generator 209 receives an instruction from one of the classical processors 105 via a demux channel 201 and generates (e.g., 4) digital samples per cycle. The digital generator patterns are sent to the digital aligners 211, which gather a sufficient number of samples (e.g., 4 ns) to drive a complete cycle of a digital pulse. A set of (e.g., 16) digital buffers 213 receive the (e.g., 16) digital sample vectors from the digital aligners 211 and execute them out of the buffers 213 according to the buffer execution signals that are dispatched from the classical processors 105.

The digital signals that the physical layer circuit 109 generates may be associated with the analog pulses transmitted from the DACs of the mixed signal/RF circuit 111, or may be associated with a readout response returning from a readout resonator and transmitted from the ADCs in the mixed signal/RF circuit 111, and used as a enable signal specifying to perform classical computation on the readout response for dynamically affecting the quantum program and/or stream it for an external user for allowing visibility of the quantum elements response.

The digital signals are fabricated in the digital generator 209 by reading, from a dedicated memory, a set of patterns that are encoded as a 1-bit value and a 15-bit duration in ns (a duration of "0" may indicate infinity, or until the next instruction). The digital generator 209 may operate on a single pattern and subtract 4 ns every cycle (if the current duration is larger than 3) or may process 4 patterns at a time (if all patterns have a duration of 1 ns).

The classical processors 105 in application 103 send 16 digital markers to the mixed signal/RF circuit 111 at a (e.g., 1 GHz) sampling rate, for example.

The application circuit 103 receives oscillator data through a 2 GHz line for use in demodulation or threshold detection of ADC inbound pulse representing qubit state estimation.

The classical processors 105 are designed to receive a response from (e.g., 8) ADCs in the mixed signal/RF circuit 111. The ADC channels may be dynamically muxed in the mixed signal/RF circuit 111 are visible to application 103 as well as other applications.

The application 103 may comprise several ("M") classical processors 105 that communicate with several ("N") physical layer modules/circuits 109 that send signals to several ("P") DAC channels in the mixed signal/RF circuit 111, where M<=N<=P. All P DACs can play together using relatively low resources of M classical processors 105 and N physical layer modules/circuits 109 because the waveforms are buffered.

Figure 3:
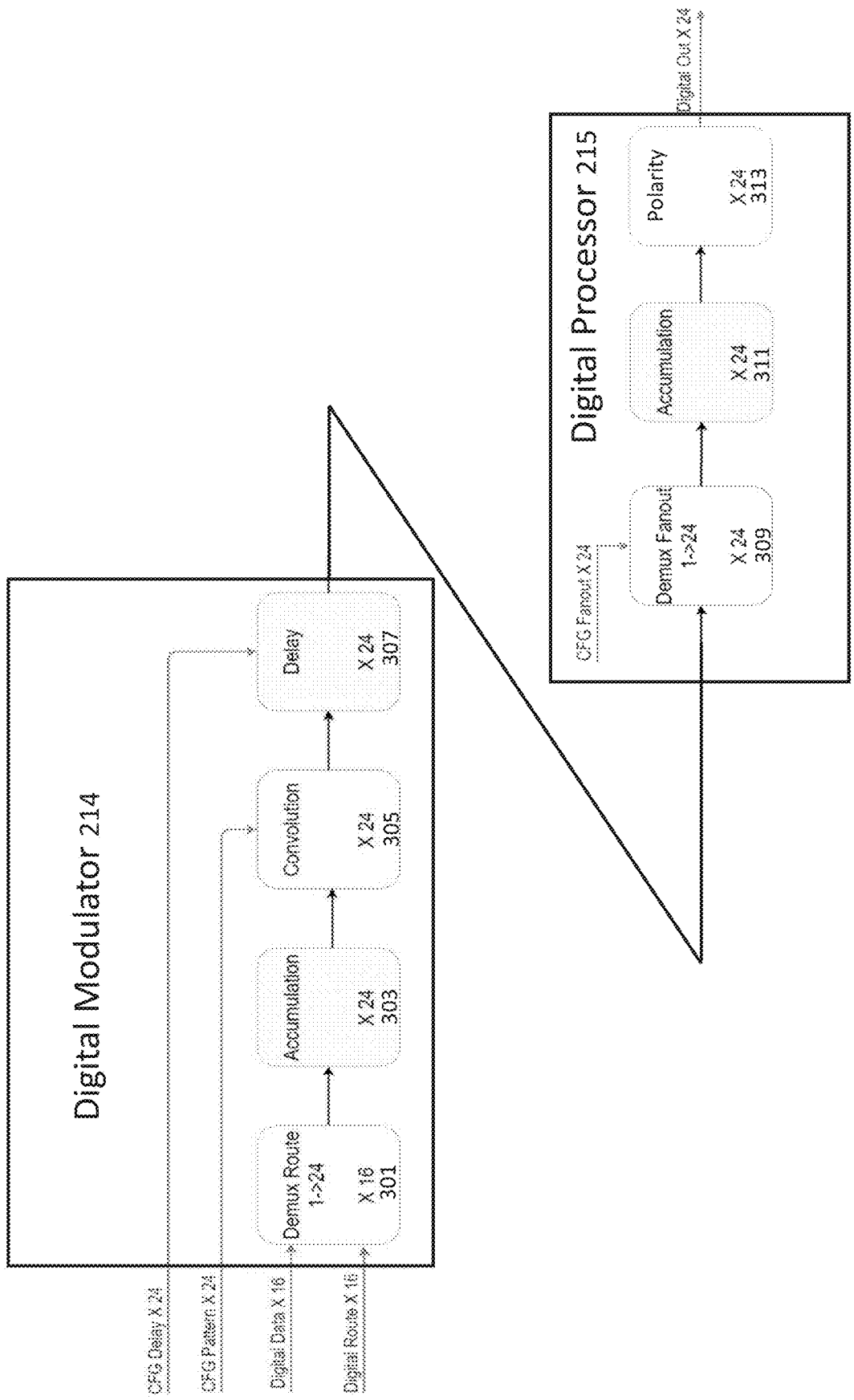
FIG. 3 illustrates an example digital modulator and digital processor for use in a system for pulse processing in accordance with various example implementations of this disclosure.

FIG. 3 illustrates an example digital modulator 214 and digital processor 215 for use in a system for pulse processing in accordance with various example implementations of this disclosure. The digital modulator 214 is the unit responsible for shaping and transforming digital pulses and routing them to the mixed signal/RF circuit 111 as digital markers.

The digital modulator 214 receives a set of raw digital pulses (e.g., 16) from digital buffers 213, as well as a routing indices, specifying to which routing channel to send the digital data. The digital modulator 214 may operate at a (e.g., 1 GHz) sample rate and the pulse granularity may be 1 ns. The digital modulator 214 may receive different pulses with different transformation instructions, and as a result, each sample should carry its own routing index.

The digital samples out of the buffers 213 are passed to a digital modulator 214 which routes 301 the digital pulses to various digital patterns. Each digital pulse is being routed 301 based on the digital route index to any of the 24 different routing channels. All of the routed pulses are then accumulated 303 separately in every channel. Then, the digital pulse in every channel undergoes digital convolution 305 with a (e.g., 256-bit) configurable pattern. The digital samples arriving to the digital patterns undergo a set of digital convolution 305, delay 307 and routing 309 to a digital output.

Following the digital convolution 305, each channel is further delayed 307 based on a predetermined configuration. The digital modulator 214 is able to play digital patterns (e.g., at 1 GHz), configure a programmable delay of a digital pulse 307, and configure smearing (convolution 305) of a digital pulse.

Following the delay 307, digital data from each channel is sent to the digital processor 215 where it is routed 309 to desired set of outputs based on a configuration fanout vector. The digital pulses out of every channel are accumulated 311 at each output, the polarity of the digital waveform is set 313, and the digital outputs are sent out of the digital processor 215 to their destination.

The accumulation 303, convolution 305 and delay 307 may use static kernels and configuration. Alternatively, the accumulation 303, convolution 305 and delay 307 may be dynamic configured (at runtime) from the classical processor for all components. Dynamic configuration may operate according to specific modification opcodes executed out of the buffers to change the configuration of all components.

Each analog pulse (output from the analog processor 223 in FIG. 2) may have a corresponding digital pulse. If multiple analog pulses are multiplexed to the same DAC (i.e., the same feedline drives multiple quantum elements with distinguishable resonating frequencies), multiple digital pulses may also undergo the same path and be output from the same digital marker.

The convolution 305 may be used to smear the digital pulse (e.g., widen the pattern and add delay). If, for example, an analog waveform of 100 ns is required, the classical processor would create a digital pulse of 100 ns to activate a gate that allows transmission of the analog pulse. In such a case, it may be beneficial to open the gate before and close the gate after the analog pulse, hence the need for widening the pulse.

The delay 307 may also be used for gating purposes. If, for example, an analog operation would result in photon emission, it may be beneficial to trigger the detector to capture this emission. In such a case, the digital pulse may be delayed. Further, the delay 307 may be required if the readout response is delayed after the readout pulse. The amount of delay may be dependent on the actual quantum hardware.

Figure 4:
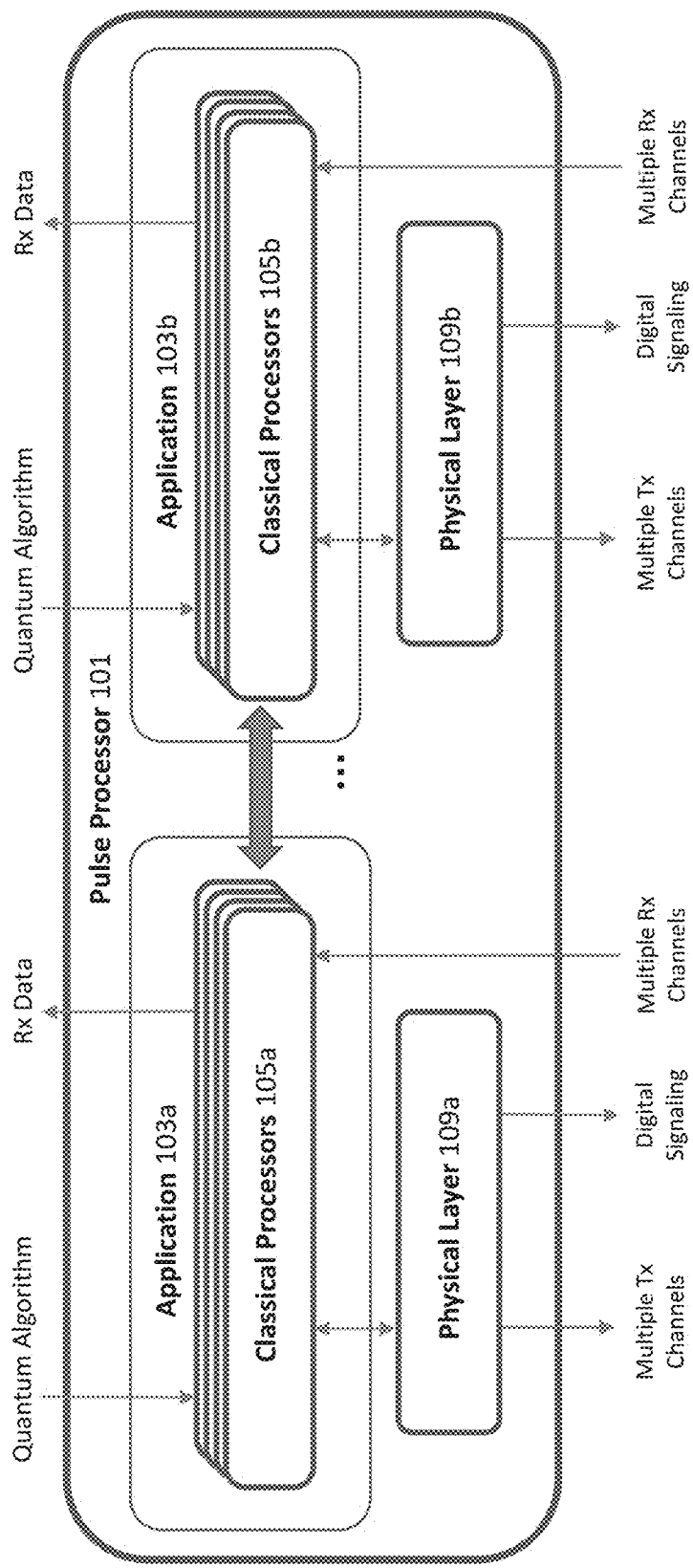
FIG. 4 illustrates a first example of communication within a system for pulse processing in a quantum device operator in accordance with various example implementations of this disclosure.

FIG. 4 illustrates a first example of communication within a system for pulse processing in a quantum device operator in accordance with various example implementations of this disclosure. In FIG. 4, pulse processor 101 comprises 2 or more application circuits 103a and 103b coupled to 2 or more physical layer circuits 109a and 109b, respectively. One application circuit 103a comprises a plurality of classical processors 105a. The other application circuit 103b comprises a plurality of classical processors 105b.

Classical processors 105a support the control flow and share data with other classical processors 105b to enable a shared and distributed decision making process across various applications 103a and 103b. Each of the applications 103a and 103b can share data (e.g., metadata, measurement results and raw data vectors) to enable the joint decision making.

Figure 5:
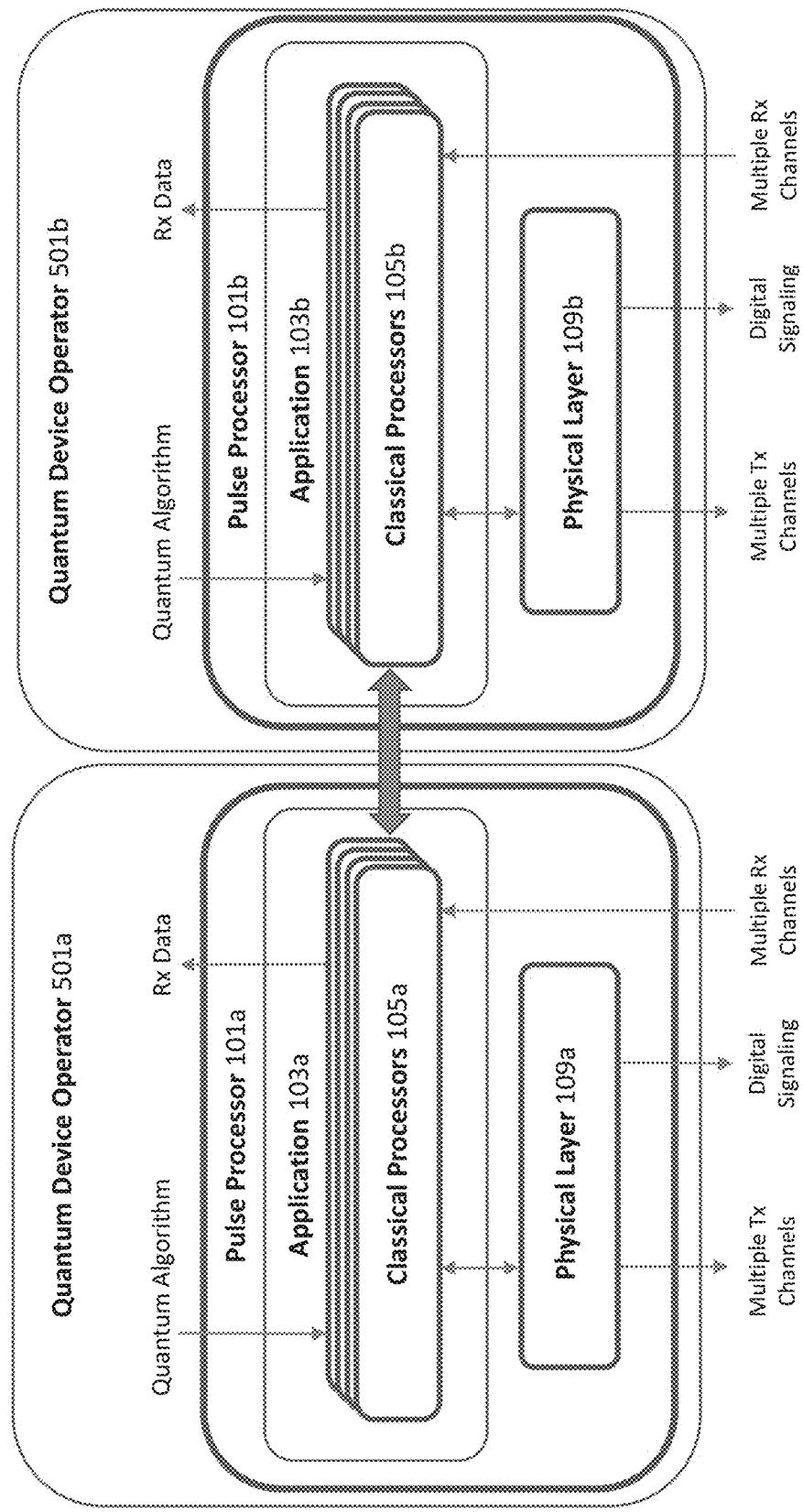
FIG. 5 illustrates a second example of communication within a system for pulse processing in a quantum device operator in accordance with various example implementations of this disclosure.

FIG. 5 illustrates a second example of communication within a system for pulse processing in a quantum device operator in accordance with various example implementations of this disclosure. In FIG. 5, classical processors 105a are located in a first QDO 501a, and classical processors 105b are located in a second QDO 501b. Each application 103a and 103b sends and receives information either through a dedicated switch or directly. This information is generated and utilized by the classical processors 105a and 105b to allow a sharing of data and metadata, syncing of operations, performing joint computation and making join flow control decisions The communication between different operators requires a physical medium and is limited compared to the communication between applications 103 in a single operator. To allocate bandwidth, each classical processor may receive the medium for a limited amount of time. Alternatively, communication may be performed in parts. For example, a master classical processor (or even one designated solely for that purpose) is the only one doing the communication. If some set of classical processors wishes to communication externally, they would first sync or share data with the master processor, which would do the external communication. In this manner, the communication is 3 steps—internal communication within 501*a*, external communication between 501*a* and 501*b*, and internal communication within 501*b*.

Figure 6:
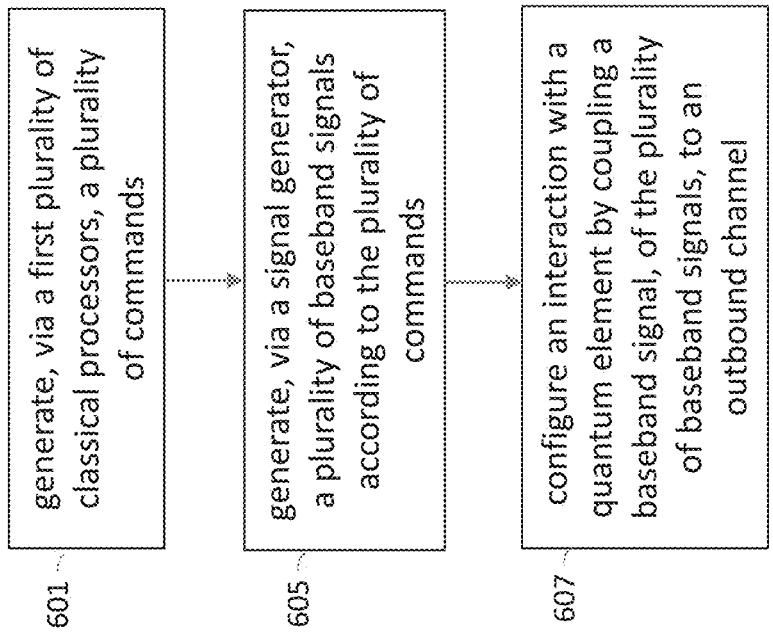
FIG. 6 illustrates a flowchart of an example method for pulse processing in a quantum device operator in accordance with various example implementations of this disclosure.

FIG. 6 illustrates a flowchart of an example method for pulse processing in a quantum device operator in accordance with various example implementations of this disclosure. The method begins by generating, via a first plurality of classical processors, a plurality of commands at 601. The first plurality of commands comprises one or more of a pulse generation command, a shaping command, a digital signal generation command and an execution command.

At 603, a plurality of baseband signals are generated, via a signal generator, according to the plurality of commands. A plurality of multi-bit samples of an analog waveform are generated according to the pulse generation command. The analog waveform is shaped according to the shaping command. A plurality of digital signals are generated according to the digital signal generation command. The plurality of digital signals are stored in a FIFO buffer and output, from the digital buffer, according the execution command. Each of the plurality of digital signals is routed, via a digital manager, as a digital marker.

An interaction with a quantum element is configured, at 605, by coupling a baseband signal, of the first plurality of baseband signals, to an outbound channel.

One or more classical processors, of the first plurality of classical processors, may communicate with one or more classical processor, of a second plurality of classical processors. The first and second pluralities of classical processors may be in the same parallel processor or in different parallel processors.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
a first classical processor operable to generate one or more commands; and
a plurality of physical layer circuits configured to simultaneously generate a plurality of analog signals and a plurality of digital signals according to the one or more commands, wherein the plurality of analog signals is operably coupled to a quantum processor via an upconverter circuit comprising a plurality of digital-to-analog converters (DACs), wherein:
a DAC rate, associated with a DAC of the plurality of DACs, is faster than a processor rate associated with the first classical processor; and
a physical layer circuit, of the plurality of physical layer circuits, is operable to generate a plurality of samples per cycle, to support the DAC rate.

2. The system of claim 1, wherein:
the number of DACs, in the plurality of DACs, is greater than the number of physical layer circuits, in the plurality of physical layer circuits.

3. The system of claim 1, wherein:
the one or more commands comprises an analog generation command, and
a physical layer circuit, of the plurality of physical layer circuits, comprises an analog signal generator operable to generate a plurality of multi-bit samples of an analog waveform according to the analog generation command.

4. The system of claim 1, wherein:
the one or more commands comprises a digital generation command, and
a physical layer circuit, of the plurality of physical layer circuits, comprises a digital signal generator operable to generate a digital signal according to the digital generation command.

5. The system of claim 1, wherein:
the one or more commands comprise an execution command,
a physical layer circuit, of the plurality of physical layer circuits, comprises a buffer circuit operable to store the plurality of analog signals and the plurality of digital signals, and
the plurality of analog signals and the plurality of digital signals are fetched from the buffer circuit, according to the execution command.

6. The system of claim 5, wherein:
the one or more commands comprise a shaping command,
a physical layer circuit, of the plurality of physical layer circuits, comprises a pulse shaper, and
prior to an analog signal being stored in the buffer circuit, the pulse shaper is operable to shape the analog signal, according to the shaping command.

7. The system of claim 5, wherein:
the one or more commands comprise a modification command,
the buffer circuit is operable to store the modification command,
a physical layer circuit, of the plurality of physical layer circuits, comprises an analog modulator, and
subsequent to an analog signal being stored in the buffer circuit, the analog modulator is operable to modulate the analog signal, according to the analog modification command.

8. The system of claim 5, wherein:
the one or more commands comprise a digital processing command,
a physical layer circuit, of the plurality of physical layer circuits, comprises a digital processor, and
subsequent to a digital signal being stored in the buffer circuit, the digital processor is operable to adjust a timing of the digital signal, according to the digital processing command.

9. The system of claim 1, wherein:
a first application circuit comprises the first classical processor,
a second application circuit comprises a second classical processor,
the first classical processor is operable to communicate with the second classical processor, and
the first application circuit and the second application circuit are located in one or more pulse processors.

10. The system of claim 1, wherein:
the system comprises at least one second classical processor; and
the number of physical layers, in the plurality of physical layer circuits, is greater than the number of first and second classical processors.

11. The system of claim 1, wherein:
the plurality of analog signals comprises one or more analog waveform types; and the analog waveform types comprise a constant pulse, an arbitrary pulse, an interpolated pulse and a dynamic ramp.

12. The system of claim 1, wherein:
at least one of the plurality of physical layer circuits is configured to apply a general manipulation matrix to control a gain of at least one analog signal of the plurality of analog signals.

13. The system of claim 1, wherein:
the plurality of physical layer circuits is configured to dynamically apply a different pulse shaping to each of the plurality of analog signals.

14. The system of claim 1, wherein:
the plurality of physical layer circuits is configured to dynamically route the plurality of analog signals to the plurality of DACs.

15. The system of claim 1, wherein:
the plurality of analog signals is generated at different times;
the plurality of physical layer circuits is configured to concatenate the plurality of analog signals; and
the plurality of physical layer circuits is configured to play the concatenated plurality of analog signals via one or more DACs of the plurality of DACs.

16. A method comprising:
generating one or more commands via a first classical processor;
simultaneously generating, via a plurality of physical layer circuits, a plurality of analog signals and a plurality of digital signals according to the one or more commands, wherein the plurality of analog signals is operably coupled to a quantum processor via an upconverter circuit comprising a plurality of digital-to-analog converters (DACs); and
generating, via a physical layer circuit of the plurality of physical layer circuits, a plurality of samples per cycle, to support a DAC rate, wherein:
the DAC rate is associated with a DAC of the plurality of DACs, and
the DAC rate is faster than a processor rate associated with the first classical processor.

17. The method of claim 16, wherein:
the number of DACs, in the plurality of DACs, is greater than the number of physical layer circuits, in the plurality of physical layer circuits.

18. The method of claim 16, wherein:
the one or more commands comprises an analog generation command, and
the method comprises generating, via a physical layer circuit of the plurality of physical layer circuits, a plurality of multi-bit samples of an analog waveform according to the analog generation command.

19. The method of claim 16, wherein:
the one or more commands comprises a digital generation command, and
the method comprises generating, via a physical layer circuit of the plurality of physical layer circuits, a digital signal according to the digital generation command.

20. The method of claim 16, wherein:
the one or more commands comprise an execution command,
a physical layer circuit of the plurality of physical layer circuits comprises a buffer circuit, and
the method comprises:
storing the plurality of analog signals and the plurality of digital signals in the buffer circuit, and fetching the plurality of analog signals and the plurality of digital signals from the buffer circuit, according to the execution command.

21. The method of claim 20, wherein:
the one or more commands comprise a shaping command,
a physical layer circuit, of the plurality of physical layer circuits, comprises a pulse shaper that is operable according to the shaping command, and
the method comprises shaping an analog signal, via the pulse shaper, prior to the analog signal being stored in the buffer circuit.

22. The method of claim 20, wherein:
the one or more commands comprise a modification command,
a physical layer circuit, of the plurality of physical layer circuits, comprises an analog modulator that is operable according to the analog modification command, and
the method comprises:
storing the modification command in the buffer circuit, and
modulating an analog signal subsequent to the analog signal being stored in the buffer circuit.

23. The method of claim 20, wherein:
the one or more commands comprise a digital processing command,
a physical layer circuit, of the plurality of physical layer circuits, comprises a digital processor that is operable according to the digital processing command, and
the method comprises adjusting a timing of a digital signal subsequent to the digital signal being stored in the buffer circuit.

24. The method of claim 16, wherein:
a first application circuit comprises the first classical processor,
a second application circuit comprises a second classical processor,
the first application circuit and the second application circuit are located in one or more pulse processors, and
the method comprises communicating between the first classical processor and the second classical processor.

25. The method of claim 16, wherein:
the system comprises at least one second classical processor; and
the number of physical layers, in the plurality of physical layer circuits, is greater than the number of first and second classical processors.

26. The method of claim 16, wherein:
the plurality of analog signals comprises one or more analog waveform types; and
the analog waveform types comprise a constant pulse, an arbitrary pulse, an interpolated pulse and a dynamic ramp.

27. The method of claim 16, wherein:
the method comprises applying a general manipulation matrix to control a gain of at least one analog signal of the plurality of analog signals.

28. The method of claim 16, wherein:
the method comprises dynamically applying a different pulse shaping to each of the plurality of analog signals.

29. The method of claim 16, wherein:
the method comprises dynamically routing the plurality of analog signals to the plurality of DACs.

30. The method of claim 16, wherein:
the plurality of analog signals is generated at different times;
the method comprises:
concatenating the plurality of analog signals; and
playing the concatenated plurality of analog signals via one or more DACs of the plurality of DACs.

31. A system comprising:
a first classical processor operable to generate one or more commands; and
a plurality of physical layer circuits configured to simultaneously generate a plurality of analog signals and a plurality of digital signals according to the one or more commands, wherein the plurality of analog signals is operably coupled to a quantum processor via an upconverter circuit comprising a plurality of digital-to-analog converters (DACs), wherein:
the one or more commands comprise an execution command,
a physical layer circuit, of the plurality of physical layer circuits, comprises a buffer circuit operable to store the plurality of analog signals and the plurality of digital signals, and
the plurality of analog signals and the plurality of digital signals are fetched from the buffer circuit, according to the execution command.

32. The system of claim 31, wherein:
the number of DACs, in the plurality of DACs, is greater than the number of physical layer circuits, in the plurality of physical layer circuits.

33. The system of claim 31, wherein:
the one or more commands comprises an analog generation command, and
a physical layer circuit, of the plurality of physical layer circuits, comprises an analog signal generator operable to generate a plurality of multi-bit samples of an analog waveform according to the analog generation command.

34. The system of claim 31, wherein:
the one or more commands comprises a digital generation command, and
a physical layer circuit, of the plurality of physical layer circuits, comprises a digital signal generator operable to generate a digital signal according to the digital generation command.

35. The system of claim 31, wherein:
the one or more commands comprise a shaping command,
a physical layer circuit, of the plurality of physical layer circuits, comprises a pulse shaper, and
prior to an analog signal being stored in the buffer circuit, the pulse shaper is operable to shape the analog signal, according to the shaping command.

36. The system of claim 31, wherein:
the one or more commands comprise a modification command,
the buffer circuit is operable to store the modification command,
a physical layer circuit, of the plurality of physical layer circuits, comprises an analog modulator, and
subsequent to an analog signal being stored in the buffer circuit, the analog modulator is operable to modulate the analog signal, according to the analog modification command.

37. The system of claim 31, wherein:
the one or more commands comprise a digital processing command,
a physical layer circuit, of the plurality of physical layer circuits, comprises a digital processor, and
subsequent to a digital signal being stored in the buffer circuit, the digital processor is operable to adjust a timing of the digital signal, according to the digital processing command.

38. The system of claim 31, wherein:
a first application circuit comprises the first classical processor,
a second application circuit comprises a second classical processor,
the first classical processor is operable to communicate with the second classical processor, and
the first application circuit and the second application circuit are located in one or more pulse processors.

39. The system of claim 31, wherein:
the system comprises at least one second classical processor; and
the number of physical layers, in the plurality of physical layer circuits, is greater than the number of first and second classical processors.

40. The system of claim 31, wherein:
the plurality of analog signals comprises one or more analog waveform types; and
the analog waveform types comprise a constant pulse, an arbitrary pulse, an interpolated pulse and a dynamic ramp.

41. The system of claim 31, wherein:
at least one of the plurality of physical layer circuits is configured to apply a general manipulation matrix to control a gain of at least one analog signal of the plurality of analog signals.

42. The system of claim 31, wherein:
the plurality of physical layer circuits is configured to dynamically apply a different pulse shaping to each of the plurality of analog signals.

43. The system of claim 31, wherein:
the plurality of physical layer circuits is configured to dynamically route the plurality of analog signals to the plurality of DACs.

44. The system of claim 31, wherein:
the plurality of analog signals is generated at different times;
the plurality of physical layer circuits is configured to concatenate the plurality of analog signals; and
the plurality of physical layer circuits is configured to play the concatenated plurality of analog signals via one or more DACs of the plurality of DACs.

45. A method comprising:
generating one or more commands via a first classical processor;
simultaneously generating, via a plurality of physical layer circuits, a plurality of analog signals and a plurality of digital signals according to the one or more commands, wherein the plurality of analog signals is operably coupled to a quantum processor via an upconverter circuit comprising a plurality of digital-to-analog converters (DACs), wherein:
the one or more commands comprise an execution command, and
a physical layer circuit of the plurality of physical layer circuits comprises a buffer circuit;
storing the plurality of analog signals and the plurality of digital signals in the buffer circuit; and
fetching the plurality of analog signals and the plurality of digital signals from the buffer circuit, according to the execution command.

46. The method of claim 45, wherein:
the number of DACs, in the plurality of DACs, is greater than the number of physical layer circuits, in the plurality of physical layer circuits.

47. The method of claim 45, wherein:
the one or more commands comprises an analog generation command, and
the method comprises generating, via a physical layer circuit of the plurality of physical layer circuits, a plurality of multi-bit samples of an analog waveform according to the analog generation command.

48. The method of claim 45, wherein:
the one or more commands comprises a digital generation command, and
the method comprises generating, via a physical layer circuit of the plurality of physical layer circuits, a digital signal according to the digital generation command.

49. The method of claim 45, wherein:
the one or more commands comprise a shaping command,
a physical layer circuit, of the plurality of physical layer circuits, comprises a pulse shaper that is operable according to the shaping command, and
the method comprises shaping an analog signal, via the pulse shaper, prior to the analog signal being stored in the buffer circuit.

50. The method of claim 45, wherein:
the one or more commands comprise a modification command,
a physical layer circuit, of the plurality of physical layer circuits, comprises an analog modulator that is operable according to the analog modification command, and
the method comprises:
storing the modification command in the buffer circuit, and
modulating an analog signal subsequent to the analog signal being stored in the buffer circuit.

51. The method of claim 45, wherein:
the one or more commands comprise a digital processing command,
a physical layer circuit, of the plurality of physical layer circuits, comprises a digital processor that is operable according to the digital processing command, and
the method comprises adjusting a timing of a digital signal subsequent to the digital signal being stored in the buffer circuit.

52. The method of claim 45, wherein:
a first application circuit comprises the first classical processor,
a second application circuit comprises a second classical processor,
the first application circuit and the second application circuit are located in one or more pulse processors, and
the method comprises communicating between the first classical processor and the second classical processor.

53. The method of claim 45, wherein:
the system comprises at least one second classical processor; and
the number of physical layers, in the plurality of physical layer circuits, is greater than the number of first and second classical processors.

54. The method of claim 45, wherein:
the plurality of analog signals comprises one or more analog waveform types; and
the analog waveform types comprise a constant pulse, an arbitrary pulse, an interpolated pulse and a dynamic ramp.

55. The method of claim 45, wherein:
the method comprises applying a general manipulation matrix to control a gain of at least one analog signal of the plurality of analog signals.

56. The method of claim 45, wherein:
the method comprises dynamically applying a different pulse shaping to each of the plurality of analog signals.

57. The method of claim 45, wherein:
the method comprises dynamically routing the plurality of analog signals to the plurality of DACs.

58. The method of claim 45, wherein:
the plurality of analog signals is generated at different times;
the method comprises:
concatenating the plurality of analog signals; and
playing the concatenated plurality of analog signals via one or more DACs of the plurality of DACs.

59. A system comprising:
a first classical processor operable to generate one or more commands; and
a plurality of physical layer circuits configured to simultaneously generate a plurality of analog signals and a plurality of digital signals according to the one or more commands, wherein the plurality of analog signals is operably coupled to a quantum processor via an upconverter circuit comprising a plurality of digital-to-analog converters (DACs), wherein:
a first application circuit comprises the first classical processor,
a second application circuit comprises a second classical processor,
the first classical processor is operable to communicate with the second classical processor, and
the first application circuit and the second application circuit are located in one or more pulse processors.

60. The system of claim 59, wherein:
the number of DACs, in the plurality of DACs, is greater than the number of physical layer circuits, in the plurality of physical layer circuits.

61. The system of claim 59, wherein:
the one or more commands comprises an analog generation command, and
a physical layer circuit, of the plurality of physical layer circuits, comprises an analog signal generator operable to generate a plurality of multi-bit samples of an analog waveform according to the analog generation command.

62. The system of claim 59, wherein:
the one or more commands comprises a digital generation command, and
a physical layer circuit, of the plurality of physical layer circuits, comprises a digital signal generator operable to generate a digital signal according to the digital generation command.

63. The system of claim 59, wherein:
the system comprises at least one second classical processor; and
the number of physical layers, in the plurality of physical layer circuits, is greater than the number of first and second classical processors.

64. The system of claim 59, wherein:
the plurality of analog signals comprises one or more analog waveform types; and
the analog waveform types comprise a constant pulse, an arbitrary pulse, an interpolated pulse and a dynamic ramp.

65. The system of claim 59, wherein:
at least one of the plurality of physical layer circuits is configured to apply a general manipulation matrix to control a gain of at least one analog signal of the plurality of analog signals.

66. The system of claim 59, wherein:
the plurality of physical layer circuits is configured to dynamically apply a different pulse shaping to each of the plurality of analog signals.

67. The system of claim 59, wherein:
the plurality of physical layer circuits is configured to dynamically route the plurality of analog signals to the plurality of DACs.

68. The system of claim 59, wherein:
the plurality of analog signals is generated at different times;
the plurality of physical layer circuits is configured to concatenate the plurality of analog signals; and
the plurality of physical layer circuits is configured to play the concatenated plurality of analog signals via one or more DACs of the plurality of DACs.

69. A method comprising:
generating one or more commands via a first classical processor;
simultaneously generating, via a plurality of physical layer circuits, a plurality of analog signals and a plurality of digital signals according to the one or more commands, wherein the plurality of analog signals is operably coupled to a quantum processor via an upconverter circuit comprising a plurality of digital-to-analog converters (DACs), wherein:
a first application circuit comprises the first classical processor,
a second application circuit comprises a second classical processor,
the first application circuit and the second application circuit are located in one or more pulse processors; and
communicating between the first classical processor and the second classical processor.

70. The method of claim 69, wherein:
the number of DACs, in the plurality of DACs, is greater than the number of physical layer circuits, in the plurality of physical layer circuits.

71. The method of claim 69, wherein:
the one or more commands comprises an analog generation command, and
the method comprises generating, via a physical layer circuit of the plurality of physical layer circuits, a plurality of multi-bit samples of an analog waveform according to the analog generation command.

72. The method of claim 69, wherein:
the one or more commands comprises a digital generation command, and
the method comprises generating, via a physical layer circuit of the plurality of physical layer circuits, a digital signal according to the digital generation command.

73. The method of claim 69, wherein:
the system comprises at least one second classical processor; and
the number of physical layers, in the plurality of physical layer circuits, is greater than the number of first and second classical processors.

74. The method of claim 69, wherein:
the plurality of analog signals comprises one or more analog waveform types; and
the analog waveform types comprise a constant pulse, an arbitrary pulse, an interpolated pulse and a dynamic ramp.

75. The method of claim 69, wherein:
the method comprises applying a general manipulation matrix to control a gain of at least one analog signal of the plurality of analog signals.

76. The method of claim 69, wherein:
the method comprises dynamically applying a different pulse shaping to each of the plurality of analog signals.

77. The method of claim 69, wherein:
the method comprises dynamically routing the plurality of analog signals to the plurality of DACs.

78. The method of claim 69, wherein:
the plurality of analog signals is generated at different times;
the method comprises:
concatenating the plurality of analog signals; and
playing the concatenated plurality of analog signals via one or more DACs of the plurality of DACs.

79. A system comprising:
a first classical processor operable to generate one or more commands; and
a plurality of physical layer circuits configured to simultaneously generate a plurality of analog signals and a plurality of digital signals according to the one or more commands, wherein the plurality of analog signals is operably coupled to a quantum processor via an upconverter circuit comprising a plurality of digital-to-analog converters (DACs), wherein:
the plurality of physical layer circuits comprises at least one second classical processor; and
the number of physical layers, in the plurality of physical layer circuits, is greater than the number of first and second classical processors.

80. The system of claim 79, wherein:
the number of DACs, in the plurality of DACs, is greater than the number of physical layer circuits, in the plurality of physical layer circuits.

81. The system of claim 79, wherein:
the one or more commands comprises an analog generation command, and
a physical layer circuit, of the plurality of physical layer circuits, comprises an analog signal generator operable to generate a plurality of multi-bit samples of an analog waveform according to the analog generation command.

82. The system of claim 79, wherein:
the one or more commands comprises a digital generation command, and
a physical layer circuit, of the plurality of physical layer circuits, comprises a digital signal generator operable to generate a digital signal according to the digital generation command.

83. The system of claim 79, wherein:
the plurality of analog signals comprises one or more analog waveform types, and
the analog waveform types comprise a constant pulse, an arbitrary pulse, an interpolated pulse and a dynamic ramp.

84. The system of claim 79, wherein:
at least one of the plurality of physical layer circuits is configured to apply a general manipulation matrix to control a gain of at least one analog signal of the plurality of analog signals.

85. The system of claim 79, wherein:
the plurality of physical layer circuits is configured to dynamically apply a different pulse shaping to each of the plurality of analog signals.

86. The system of claim 79, wherein:
the plurality of physical layer circuits is configured to dynamically route the plurality of analog signals to the plurality of DACs.

87. The system of claim 79, wherein:
the plurality of analog signals is generated at different times;
the plurality of physical layer circuits is configured to concatenate the plurality of analog signals; and
the plurality of physical layer circuits is configured to play the concatenated plurality of analog signals via one or more DACs of the plurality of DACs.

88. A method comprising:
generating one or more commands via a first classical processor or a second classical processor; and
simultaneously generating, via a plurality of physical layer circuits, a plurality of analog signals and a plurality of digital signals according to the one or more commands, wherein the plurality of analog signals is operably coupled to a quantum processor via an upconverter circuit comprising a plurality of digital-to-analog converters (DACs), wherein the plurality of physical layer circuits comprises at least one second classical processor; and the number of physical layers, in the plurality of physical layer circuits, is greater than the number of first and second classical processors.

89. The method of claim 88, wherein:
the number of DACs, in the plurality of DACs, is greater than the number of physical layer circuits, in the plurality of physical layer circuits.

90. The method of claim 89, wherein:
the one or more commands comprises an analog generation command, and
the method comprises generating, via a physical layer circuit of the plurality of physical layer circuits, a plurality of multi-bit samples of an analog waveform according to the analog generation command.

91. The method of claim 89, wherein:
the one or more commands comprises a digital generation command, and
the method comprises generating, via a physical layer circuit of the plurality of physical layer circuits, a digital signal according to the digital generation command.

92. The method of claim 89, wherein:
the plurality of analog signals comprises one or more analog waveform types; and
the analog waveform types comprise a constant pulse, an arbitrary pulse, an interpolated pulse and a dynamic ramp.

93. The method of claim 89, wherein:
the method comprises applying a general manipulation matrix to control a gain of at least one analog signal of the plurality of analog signals.

94. The method of claim 89, wherein:
the method comprises dynamically applying a different pulse shaping to each of the plurality of analog signals.

95. The method of claim 89, wherein:
the method comprises dynamically routing the plurality of analog signals to the plurality of DACs.

96. The method of claim 89, wherein:
the plurality of analog signals is generated at different times;
the method comprises:
concatenating the plurality of analog signals; and
playing the concatenated plurality of analog signals via one or more DACs of the plurality of DACs.

97. A system comprising:

a first classical processor operable to generate one or more commands; and a plurality of physical layer circuits configured to simultaneously generate a plurality of analog signals and a plurality of digital signals according to the one or more commands, wherein the plurality of analog signals is operably coupled to a quantum processor via an upconverter circuit comprising a plurality of digital-to-analog converters (DACs), wherein:

the plurality of analog signals is generated at different times;

the plurality of physical layer circuits is configured to concatenate the plurality of analog signals; and the plurality of physical layer circuits is configured to play the concatenated plurality of analog signals via one or more DACs of the plurality of DACs.

98. The system of claim 97, wherein:
the number of DACs, in the plurality of DACs, is greater than the number of physical layer circuits, in the plurality of physical layer circuits.

99. The system of claim 97, wherein:
the one or more commands comprises an analog generation command, and
a physical layer circuit, of the plurality of physical layer circuits, comprises an analog signal generator operable to generate a plurality of multi-bit samples of an analog waveform according to the analog generation command.

100. The system of claim 97, wherein:
the one or more commands comprises a digital generation command, and
a physical layer circuit, of the plurality of physical layer circuits, comprises a digital signal generator operable to generate a digital signal according to the digital generation command.

101. The system of claim 97, wherein:
the plurality of analog signals comprises one or more analog waveform types; and
the analog waveform types comprise a constant pulse, an arbitrary pulse, an interpolated pulse and a dynamic ramp.

102. The system of claim 97, wherein:
at least one of the plurality of physical layer circuits is configured to apply a general manipulation matrix to control a gain of at least one analog signal of the plurality of analog signals.

103. The system of claim 97, wherein:
the plurality of physical layer circuits is configured to dynamically apply a different pulse shaping to each of the plurality of analog signals.

104. The system of claim 97, wherein:
the plurality of physical layer circuits is configured to dynamically route the plurality of analog signals to the plurality of DACs.

105. A method comprising:
generating one or more commands via a first classical processor;
simultaneously generating, via a plurality of physical layer circuits, a plurality of analog signals and a plurality of digital signals according to the one or more commands, wherein the plurality of analog signals is operably coupled to a quantum processor via an upconverter circuit comprising a plurality of digital-to-analog converters (DACs);
concatenating the plurality of analog signals; and
playing the concatenated plurality of analog signals via one or more DACs of the plurality of DACs, wherein the plurality of analog signals is generated at different times.

106. The method of claim 105, wherein:
the number of DACs, in the plurality of DACs, is greater than the number of physical layer circuits, in the plurality of physical layer circuits.

107. The method of claim 105, wherein:
the one or more commands comprises an analog generation command, and
the method comprises generating, via a physical layer circuit of the plurality of physical layer circuits, a plurality of multi-bit samples of an analog waveform according to the analog generation command.

108. The method of claim 105, wherein:
the one or more commands comprises a digital generation command, and
the method comprises generating, via a physical layer circuit of the plurality of physical layer circuits, a digital signal according to the digital generation command.

109. The method of claim 105, wherein:
the plurality of analog signals comprises one or more analog waveform types; and
the analog waveform types comprise a constant pulse, an arbitrary pulse, an interpolated pulse and a dynamic ramp.

110. The method of claim 105, wherein:
the method comprises applying a general manipulation matrix to control a gain of at least one analog signal of the plurality of analog signals.

111. The method of claim 105, wherein:
the method comprises dynamically applying a different pulse shaping to each of the plurality of analog signals.

112. The method of claim 105, wherein:
the method comprises dynamically routing the plurality of analog signals to the plurality of DACs.

* * * * *